Jan. 23, 1951 T. A. TE GROTENHUIS 2,538,809
PROCESS OF COMPOUNDING RUBBERY POLYMERS
Filed June 26, 1946
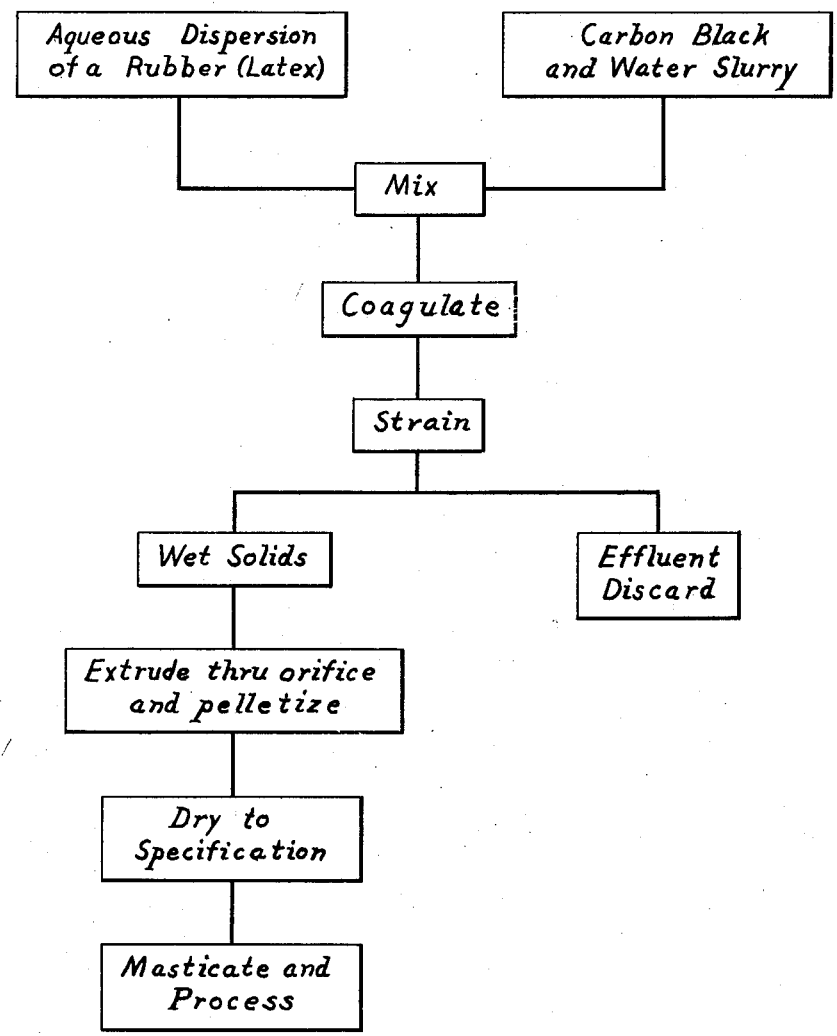
INVENTOR.
Theodore A. TeGrotenhuis
BY
Evans + McCoy
ATTORNEYS Patented Jan. 23, 1951

2,538,809

UNITED STATES PATENT OFFICE 2,538,809

PROCESS OF COMPOUNDING RUBBERY POLYMERS

Theodore A. Te Grotenhuis, Olmsted Falls, Ohio, assignor to The General Tire & Rubber Company, Akron, Ohio, a corporation of Ohio Application June 26, 1946, Serial No. 679,386

3 Claims. (Cl. 18—55)

This application is a continuation in part of my copending application Serial No. 603,256, filed July 4, 1945, and entitled "Vehicle Tire and Method of Making the Same." The invention relates to a method of incorporating carbon black into rubber whereby the use of masticating machinery is reduced to a minimum. It particularly relates to a process of producing compounded rubbers which are devoid of visible carbon-black agglomerates.

In the usual method of preparing compounds of natural or synthetic rubbers, the rubber is masticated a substantial time in a mill or Banbury mixer, where the pigments are added in the dry state. The mastication requires considerable time, acts to greatly deteriorate many of the desirable properties of the rubber, and utilizes large amounts of expensive power.

It has, for many years, been proposed to reduce the time required for mastication of natural and synthetic rubbers such as copolymers of butadiene compounds with styrenes, acrylonitrile or the like, by incorporating into the latex or aqueous dispersion of rubbery material a suitable dispersion of carbon black or other compounding agent and to coagulate and dry the solids from the mixture thus prepared.

While the compounding of rubbery materials in latex form has permitted a considerable saving in masticating time, the rubber compounds produced have usually been unsatisfactory because of a large number of relatively hard particles distributed in the rubber compound, the particles remaining even through the mastication of the rubber compound was continued for extensive periods. Such particles had a tendency to cause cracking or tearing of the rubber stock although the tensile strength of the rubber stock may be equivalent in either case.

It is an object of the present invention to provide a method of preparing mixtures of rubber and carbon black which are substantially devoid of the hard visible particles and which process still gives savings in time and power inherent with latex compounding.

It is another object of the invention to provide a dry rubber carbon-black mixture having relatively large amounts of carbon black and having the rubber in a form undeteriorated by mastication.

Other objects will be apparent from the following description of the invention which is illustrated by the drawing, which is a flow sheet, showing the steps of my preferred process.

I have earlier pointed out that the objectionable particles in the rubber compound produced by ordinary latex compounding procedures are particles of undispersed carbon and that these particles are apparently indispersible by masticating the relatively soft rubber mix. While such particles may be greatly reduced to some extent by the use of greatly increased amounts of dispersing agent, it appears that they are also formed by agglomeration of the carbon black particles during the coagulating of the latex mixture and are not merely the result of incomplete dispersion of the carbon black particles within the aqueous mixture.

Mastication of the solid coagulum before drying, or while it still retains a few per cent of moisture, markedly decreases or eliminates the solid particles, but such mastication of the coagulum before any drying is quite difficult due to the tendency for slippage on rolls and the resulting wet masticated product is open to some objection due to the fact that the mastication closes the open pore structure and the subsequent drying thereafter is slow unless the section be very thin.

In accordance with the present invention the objectionable solid particles within the rubber stock are substantially entirely eliminated when the wet coagulum is simply extruded through orifices or passageways having one dimension of ¾" or less, and preferably ¼" or less. The passage of the wet coagulum through such orifices tends to squeeze out excess water and surprisingly smears the particles of black through the material so that upon subsequent drying to any desired dryness, hard particles simply are not formed, at least to an appreciable or objectionable degree.

The extrusion is preferably done in a pelletizing tuber where the extruded pieces are cut up into relatively short lengths or pellets. Pelletizing tubers, or simply pelletizers as they are called, have orifices about ¼" in diameter and the pieces are usually cut to about ½" lengths. A special low pitch screw is frequently required to obtain sufficient pressure for extrusion of the rubber mix having higher loadings than 30 parts of black per 100 of rubber. The pellets produced have a considerably different appearance than the carbon black crumb heretofore produced prior to the present invention. The rubber-carbon black crumb, when handled, deposits free black on the hands, and when completely dried and masticated provides rubber having the objectionable hard particles present. The extruded sections or pellets, above described, on the other hand do not soil the hands when handled and when masticated provide rubber compounds which are conspicuous for the absence of the hard particles generally noticed in the latex compounded rubber.

In carrying out the process of the present invention a carbon black and water slurry, or a dispersion of carbon black and water is first prepared. This may be accomplished by any convenient method, simply by stirring the carbon black with water with or without the addition of a dispersing agent such as condensation products of naphthalene sulfonic acids with formaldehyde, lignin sulfonic acids, quebracho, etc.

The addition of a dispersing agent permits the preparation of a flowable slurry with a higher carbon-black content than is possible with a simple carbon-black water mixture. Unless the slurry is to be transmitted through pipe for a substantial distance prior to its incorporation in the aqueous rubber dispersion or latex, or unless it is desired to maintain the carbon-black slurry in suspension without maintaining agitation, the use of a dispersing agent is entirely unnecessary, due to the fact that the agglomerates are so effectually smeared out in accordance with the present invention by the extruding or pelletizing process.

The carbon-black slurry, having at least sufficient water to wet the carbon black is added to the aqueous rubber dispersion in sufficient proportion to form a rubber carbon-black mix containing the desired proportions of rubber and carbon black after all the solids present are coagulated together. Generally the proportions of the slurry and the aqueous dispersion are such as to provide about 10 or 15 to about 50 or 60 parts of carbon black per 100 parts of rubber solids, although somewhat larger and smaller percentages of carbon black may be used. For tread compounds 25 to 50 parts of black per 100 of rubber are usually preferred. When the amount of black is increased above 70 or 80 per cent, the stiffness of the rubber mixture is usually too great and the main advantages of the process are not obtained. Such a mixture may be utilized, however, with added rubber or rubber compound having a lower pigment loading.

Coagulation of the relatively fluid latex-black mixture may be accomplished in any suitable manner, as by the addition of an electrolyte, such as a salt and/or acidic material with concurrent stirring. To facilitate washing, coagulation is preferably accomplished according to methods by which a crumb of moderate size is obtained. Thus, a crumb may be obtained, as is well-known in the art, by adding a salt solution to the latex-like mixture in sufficient amount to render the mix unstable. In the ordinary synthetic rubber plants, coagulation is accomplished by mixing the latex with a substantial quantity of salt solution under conditions of turbulence, and thereafter incorporating acidic material, such as sulfuric or acetic acid, to change soap to fatty acid. This method or any other method may be used in accordance with my process.

The coagulum or solid matter is then strained from the main portion of the affluent, and in accordance with the present invention extruded through orifices or passageways having one dimension of about ¾" or less to effect smearing of the carbon-black agglomerates. The extrusion is preferably accomplished while the coagulum is very wet, that is after separating the free affluent as by straining, and while moisture content is still at least 15 or 20 per cent, based on the rubber. Even though dispersing agent has been omitted from the carbon-black slurry, it is found that this smearing action substantially eliminates the formation of the hard particles in the completed rubber compound. The extruded strips or pellets, as the case may be, are then preferably passed through a drier in the usual manner where they may be dried to the specifications which usually require a maximum volatile content of .5%, based on the rubbery content.

The aforementioned treatment is applicable to the processing of natural or synthetic rubbers, including the sulfur vulcanizable synthetic rubbers and other polymers of solid polymerization products of elastogenic materials. Vulcanizable rubbery copolymers of one or more conjugated butadiene compounds such as butadiene-1,3, isoprene, cloroprene, piperylene, cyanoprene and the like, with a monovinyl compound such as arylvinyl componds including styrene, dichlorostyrenes, alpha-methylstyrene, 3,4 and 3,5 dichloro-alpha-methylstyrenes, parachlorostyrene, paratrifluoromethylstyrene, acrylic and methacrylic acids, esters, nitriles, and amides, dimethyl vinyl ethynyl carbinol vinyl pyridine, and the like.

The following example illustrates the invention:

*Example I*

| | Parts |
|---|---|
| Easy processing channel carbon black (unbeaded) | 45 |
| Water | 450 |
| 25% G. R. S. latex [1] | 400 |

[1] G. R. S. is an emulsion copolymer of butadiene and styrene.

The carbon black and water were mixed together and while being maintained under constant agitation was added to the latex and thoroughly mixed therewith. The mixture thus obtained was poured with stirring into a suitable coagulant, such as a highly agitated solution of salt and acetic acid, to coagulate the rubber in the form of crumbs having a maximum dimension of about ¼" or so. The crumbs thus prepared were filtered or strained from the free affluent and passed into a pelletizing tuber having a relatively low pitch screw and extruded through openings having a diameter of about ¼". The strips from the tuber were cut into pellets upon emergence from the passageway and passed through the conventional drier where they were dried to less than .2% volatile matter. The dried pellets were compounded in a Banbury mixer with the usual added curing agents such as sulfur accelerator, antioxidant and zinc oxide to form a standard tire tread recipe. The mixing and masticating operation was complete in less than ⅓ of the time required for mixing the same rubber with the carbon black by the conventional dry mixing process.

The rubber obtained had a tensile strength of about 3,000 pounds per square inch and elongation above 600% and showed an entire absence of visible agglomerates, indicating a good dispersion of carbon black.

*Example II*

When, in the above example, the crumb from the coagulation was simply filtered and passed through the drier in the usual manner, the extrusion through restricted passageways being omitted, and the dried crumb compound masticated and treated exactly as the pellets in the preceding example, the rubber compound produced had an extremely large number of objectionable particles distributed therethrough. These particles were very apparent to the naked eye on viewing a freshly cut section.

When the crumb of Example II was masticated three times as long as before, relatively hard particles were still present in the rubber in apparently the same proportion, indicating that the mastication was entirely ineffective in causing the dispersion.

The carbon black in the preceding examples may be substituted by other types of carbon black if desired, and as mentioned before the dispersing agent may be present to make the slurry more fluid, or the slurry may be treated with a colloid mill or other dispersing apparatus. The G. R. S. latex may be substituted by a latex of other polymers of one or more elastogenic materials to obtain results also showing the improvements obtained by the extrusion process.

The present invention is particularly applicable to the preparation of "low Mooney" synthetic rubbers; that is, rubbers which are exceedingly plastic and have a reading of less than 40 or 45 on the Mooney plastometer. Such highly plastic rubbers may be prepared by polymerizing the monomeric materials to relatively low degree of conversion or polymerizing the monomeric materials in the presence of a relatively large amount of modifying agent such as dodecyl mercaptan or other mercaptan, or material known to increase the plasticity of the polymer. In such highly plastic material the tendency for formation of large numbers of agglomerates which cannot be dispersed by the usual masticating operations is exceedingly great when prior methods of latex compounding are used.

It will be seen that the present invention permits the drying of the coagulum from latex rubber-carbon black mixtures to complete dryness, and still permits excellent dispersions and properties in the final product. It permits the utilization of latex compounding with "low Mooney rubbers" so that the mastication is reduced a very small fraction of that normally required for processing with the result of great saving in cost of production of rubber articles. In addition, the present invention permits the elimination of the large proportions of dispersing agent before required to produce a commercial product with latex compounding procedures.

Elastogenic is used herein as in Patent 2,384,277, to mean capable of forming rubberlike materials.

The Mooney plastometer is described in an article entitled : "A shearing disc plastometer for unvulcanized rubber" by Melvin Mooney, published in Industrial and Engineering Chemistry, Anal. Ed., 6, 147 (1934). The measurement of plasticity or plasticity standards are also described in the "Government Specification for Synthetic Rubbers," July 1945.

As apparent from the above article and specification, as the plasticity of a rubber increases the Mooney plasticity reading decreases. In the appended claims the term "Mooney plasticity reading" is intended to designate the reading on the shearing disc plastometer described above, as measured under the conditions set forth in the aforementioned article and publication.

It is to be understood that variations and modifications of the specific processes herein shown and described for purposes of illustration may be made without departing from the spirit of the invention.

What I claim is:

1. In a method of compounding a polymerization product of a conjugated diolefinic compound which product is vulcanizable to the elastic state generally characteristic of soft vulcanized rubber and has a Mooney plasticity reading of less than 40, wherein carbon black in amounts of 25% to 70% (based on the weight of said polymerization product) is combined with an aqueous dispersion of said polymer and solids of said polymerization product are coagulated together and dried, the steps which comprise coagulating the solids, separating some water from them, and thereafter deforming and subsequently extruding the wet coagulated solids of said mixture of carbon black and polymerization product through an opening having a cross sectional dimension less than ¾" to cause smearing of the agglomerated carbon black particles while they are wet and before they are hardened by drying to produce agglomerates that are undispersible by milling in the relatively soft polymerization product.

2. In a method of compounding a polymerization product of butadiene and styrene wherein carbon black in the form of an aqueous slurry and in amounts of 25% to 70% (based on the weight of said polymerization product) is combined with an aqueous dispersion of said polymerization product and solids of said polymerization product are coagulated together and dried, the steps which comprise coagulating solids and separating some water from them, and thereafter deforming and extruding through orifices having a cross sectional dimension of less than ¼" the wet coagulated solids of said coagulated mixture of carbon black and polymerization product to cause smearing out of carbon black agglomerates prior to the time when they are hardened to undispersible form by drying, said polymerization product being vulcanizable to the elastic state generally characteristic of soft vulcanized rubber and having a Mooney plasticity reading of less than 40.

3. A method of compounding a polymerization product of a conjugated diolefinic compound having a chain length of 4 carbon atoms and a mono-olefinic compound copolymerizable therewith, wherein carbon black in the form of an aqueous slurry and in amounts of 25% to 70% (based on the weight of said polymerization product) is combined with an aqueous dispersion of said polymerization product and solids of the mixture of said slurry and said aqueous dispersion are coagulated together and dried, the steps which comprise coagulating the solids, separating some water therefrom, and thereafter deforming and then pelletizing the wet coagulated solids of said coagulated mixture of carbon black by extruding them through an opening having a cross sectional dimension not in excess of ¼" and cutting the extruded product, whereby smearing out of the wet carbon black agglomerates in said coagulum takes place before they have been hardened to the undispersible form by subsequent drying, said polymerization product having a Mooney plasticity reading of less than 40 and being vulcanizable to the rubbery state generally characteristic of soft vulcanized rubber.

THEODORE A. TE GROTENHUIS.

REFERENCES CITED

The following references are of record in the file of this patent:

UNITED STATES PATENTS

| Number | Name | Date |
| --- | --- | --- |
| 2,209,928 | Nowak | July 30, 1940 |
| 2,319,859 | Hale | May 25, 1943 |
| 2,354,424 | Novotny et al. | July 25, 1944 |